(12) United States Patent
Carlson et al.

(10) Patent No.: US 7,484,885 B1
(45) Date of Patent: Feb. 3, 2009

(54) THERMAL IMAGER HAVING SUNLIGHT EXPOSURE PROTECTION MECHANISM

(75) Inventors: Paul S. Carlson, Santa Cruz, CA (US); Thomas Heinke, Santa Cruz, CA (US)

(73) Assignee: Raytek Corporation, Santa Cruz, CA (US)

( * ) Notice: Subject to any disclaimer, the term of this patent is extended or adjusted under 35 U.S.C. 154(b) by 0 days.

(21) Appl. No.: 10/881,710

(22) Filed: Jun. 30, 2004

(51) Int. Cl.
*G01J 5/06* (2006.01)
(52) U.S. Cl. .................. 374/132; 374/133; 374/121; 250/338.1; 356/43
(58) Field of Classification Search ............... 374/120, 374/121, 130–133, 208; 250/338.1; 356/43, 356/51; 396/448
See application file for complete search history.

(56) References Cited

U.S. PATENT DOCUMENTS

| | | | |
|---|---|---|---|
| 2,906,187 A * | 9/1959 | Dotson et al. ............... 396/235 |
| 3,626,825 A * | 12/1971 | Years ......................... 396/213 |
| 3,758,796 A * | 9/1973 | Years ......................... 327/514 |
| 4,025,930 A * | 5/1977 | Wolff .......................... 396/29 |
| 4,314,743 A * | 2/1982 | Rast ............................ 359/243 |
| 4,467,325 A * | 8/1984 | Lustig ......................... 345/207 |
| 4,494,881 A * | 1/1985 | Everest ....................... 374/124 |
| 4,634,294 A | 1/1987 | Christol et al. |
| 4,829,269 A * | 5/1989 | Minahan ..................... 359/241 |
| 5,091,646 A * | 2/1992 | Taylor ......................... 250/332 |
| 5,133,605 A * | 7/1992 | Nakamura ................... 374/124 |
| 5,287,183 A * | 2/1994 | Thomas et al. .............. 348/571 |
| 5,386,117 A | 1/1995 | Piety et al. |
| 5,420,419 A | 5/1995 | Wood |
| 5,524,984 A | 6/1996 | Hollander et al. |
| 5,637,871 A | 6/1997 | Piety et al. |
| 5,653,537 A * | 8/1997 | Ignatowicz et al. ......... 374/131 |
| 5,675,149 A * | 10/1997 | Wood et al. ................. 250/332 |
| 5,748,441 A * | 5/1998 | Loritz et al. ................ 361/683 |
| 5,994,701 A * | 11/1999 | Tsuchimoto et al. ........ 250/351 |
| 6,045,078 A * | 4/2000 | Zander ..................... 242/332.1 |

(Continued)

FOREIGN PATENT DOCUMENTS

DE 2324408 A * 12/1974

(Continued)

OTHER PUBLICATIONS

Manual entitled "ThermoView Ti30 High Performance Thermal Imager for Predictive Maintenance," bearing a copyright date of 2003.

*Primary Examiner*—Gail Verbitsky
(74) *Attorney, Agent, or Firm*—Nelson Mullins Riley & Scarborough, LLP

(57) ABSTRACT

A thermal imaging apparatus comprises a housing defining an entrance pupil for ingress of imaging radiation. At least one light sensor is positioned forward of the entrance pupil. An electronic imaging device such as a focal plane array is located in the housing rearward of the entrance pupil for converting imaging radiation to electrical signals for further processing. The apparatus further includes a shutter having an open position and a closed position. In the closed position, the shutter is located between the entrance pupil and the electronic imaging device so as to inhibit exposure of the electronic imaging device to incident radiation. Circuitry is provided for selectively operating the shutter to be in the closed position based on signals produced at the light sensor.

17 Claims, 3 Drawing Sheets

U.S. PATENT DOCUMENTS

| | | | |
|---|---|---|---|
| 6,144,030 A | 11/2000 | Ray et al. | |
| 6,144,031 A | 11/2000 | Herring et al. | |
| 6,353,223 B1 | 3/2002 | Ookawa | |
| 6,441,854 B2 * | 8/2002 | Fellegara et al. | 348/333.13 |
| 6,450,708 B1 * | 9/2002 | Takanashi | 396/448 |
| 6,486,473 B2 | 11/2002 | Salapow et al. | |
| 6,521,892 B2 * | 2/2003 | Emanuel et al. | 250/332 |
| 6,580,563 B1 * | 6/2003 | Finney | 359/632 |
| 6,630,670 B2 * | 10/2003 | Salisbury et al. | 250/330 |
| 6,712,502 B2 * | 3/2004 | Zalameda et al. | 374/5 |
| 7,030,907 B2 * | 4/2006 | Nagao et al. | 348/164 |
| 7,083,291 B1 * | 8/2006 | Yong et al. | 359/612 |
| 7,157,705 B2 | 1/2007 | Hamrelius et al. | |
| 2002/0003584 A1 * | 1/2002 | Kossin | 348/373 |
| 2003/0128737 A1 * | 7/2003 | MaGrath et al. | 374/161 |
| 2004/0070682 A1 * | 4/2004 | Voss et al. | 348/362 |
| 2004/0246607 A1 * | 12/2004 | Watson et al. | 359/872 |
| 2004/0264542 A1 | 12/2004 | Kienitz | |

FOREIGN PATENT DOCUMENTS

| | | | |
|---|---|---|---|
| DE | 2534656 A | * | 2/1977 |
| JP | 61180218 A | * | 8/1986 |
| JP | 03274971 A | * | 12/1991 |
| JP | 2000098461 A | * | 4/2000 |
| JP | 2003348414 A | * | 12/2003 |
| JP | 2004309672 A | * | 11/2004 |
| JP | 2005283943 A | * | 10/2005 |
| JP | 2006018144 A | * | 1/2006 |

* cited by examiner

THERMAL IMAGER HAVING SUNLIGHT EXPOSURE PROTECTION MECHANISM

BACKGROUND OF THE INVENTION

The present invention relates generally to thermal imagers. More particularly, the invention relates to a thermal imager having a mechanism for protecting internal components from damage due to sunlight and other high energy radiation sources.

Thermal imaging cameras are widely used in a variety of applications, such as predictive maintenance in industrial facilities. While past imagers often utilized a scanning technique, modern imagers generally incorporate an infrared (IR) focal plane array (FPA) for producing the thermal image. Focal plane arrays have many advantages, such as the speed at which successive images can be produced for display.

One drawback of current focal plane arrays is their susceptibility to damage when exposed to high radiation sources such as sunlight. For example, a user may inadvertently damage the focal plane array (and thus the overall imager) by waving the imager's lens in a direction toward the sun. Thus, a need exists to provide methods of protecting the focal plane array from sunlight exposure.

SUMMARY OF THE INVENTION

According to one aspect, the present invention provides a thermal imaging apparatus comprising a housing defining an entrance pupil for ingress of imaging radiation. At least one light sensor is positioned forward of the entrance pupil. An electronic imaging device is located in the housing rearward of the entrance pupil for converting imaging radiation to electrical signals for further processing.

The apparatus further includes a shutter having an open position and a closed position. In the closed position, the shutter is located between the entrance pupil and the electronic imaging device so as to inhibit exposure of the electronic imaging device to incident radiation. Circuitry is provided for selectively operating the shutter to be in the closed position based on signals produced at the light sensor. In presently preferred embodiments, the electronic imaging device is a focal plane array (such as an alpha-silicon or vanadium oxide infrared focal plane array).

The light sensor may be located in a portion of the housing forward of the entrance pupil which forms a hood. For example, the light sensor may be situated at a position in the hood below the entrance pupil. In such a position, the light sensor will detect sun exposure before imaging thereof by the electronic imaging device. Often, a silicon phototransistor may be utilized as the light sensor. In some exemplary embodiments, the light sensor may comprise a pair of light sensors located at respective left and right positions below the entrance pupil.

Preferably, the thermal imaging apparatus may comprise a lens cap adapted to cover the entrance pupil when the apparatus is not in use. The apparatus may be advantageously adapted to be in a powered off state when the lens cap is in position to cover the entrance pupil.

Other aspects of the present invention are achieved by an imaging apparatus comprising structure defining an entrance pupil for ingress of imaging radiation. A focal plane array is located rearward of a lens at the entrance pupil. A shutter is provided having an open position and a closed position. In the closed position, the shutter is located between the lens and the focal plane array so as to inhibit exposure of the focal plane array to incident radiation. Circuitry is provided for selectively operating the shutter to be in the closed position when radiation that would otherwise impinge the focal plane array exceeds a predetermined threshold.

Additional aspects of the present invention are achieved by an imaging apparatus comprising structure defining an entrance pupil for ingress of imaging radiation. A focal plane array is located rearward of a lens at the entrance pupil. A shutter is provided having an open position and a closed position. In the closed position, the shutter is located between the lens and the focal plane array so as to inhibit exposure of the focal plane array to incident radiation.

The apparatus also includes circuitry for selectively operating the shutter to be in the closed position when radiation that would otherwise impinge the focal plane array exceeds a predetermined threshold. At least one light sensor is located forward of the lens, the circuitry being operative to control the shutter based on signals produced at the light sensor. A lens cap adapted to cover the entrance pupil when the apparatus is not in use is also provided. The apparatus is adapted to be in a powered off state when the lens cap is in position to cover the entrance pupil.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
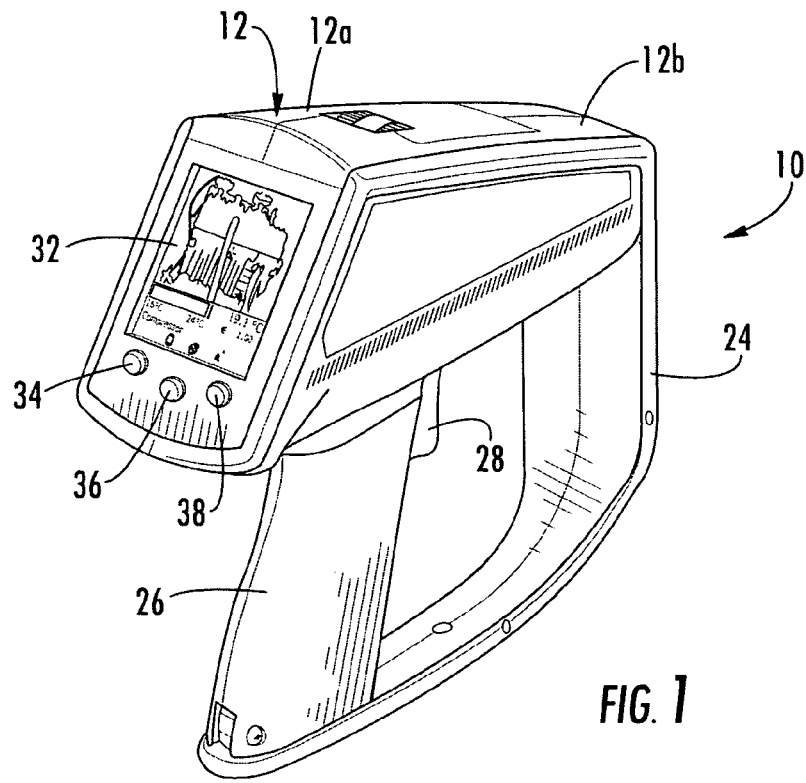
FIG. 1 is a rear perspective view of a thermal imager constructed in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 2:
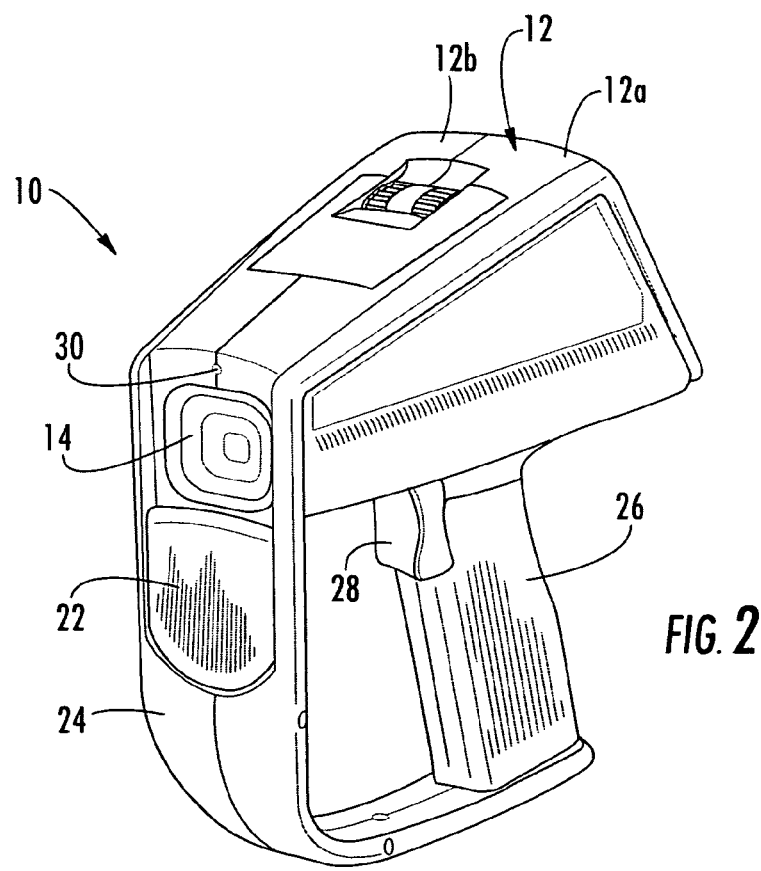
FIG. 2 is a front perspective view of the thermal imager of FIG. 1.

FIGS. 1 and 2 illustrate a thermal imager 10 constructed in accordance with the present invention. Imager 10 includes a housing 12 in which the components of a thermal image camera are located. Preferably, housing 12 is formed by complementary left and right housing portions 12a and 12b which are joined together during assembly. While any suitable material can be utilized, housing portions 12a and 12b are preferably formed of a rigid high impact plastic material. Selected regions of housing 12 may be desirably overmolded with a softer polymeric material.

Figure 3:
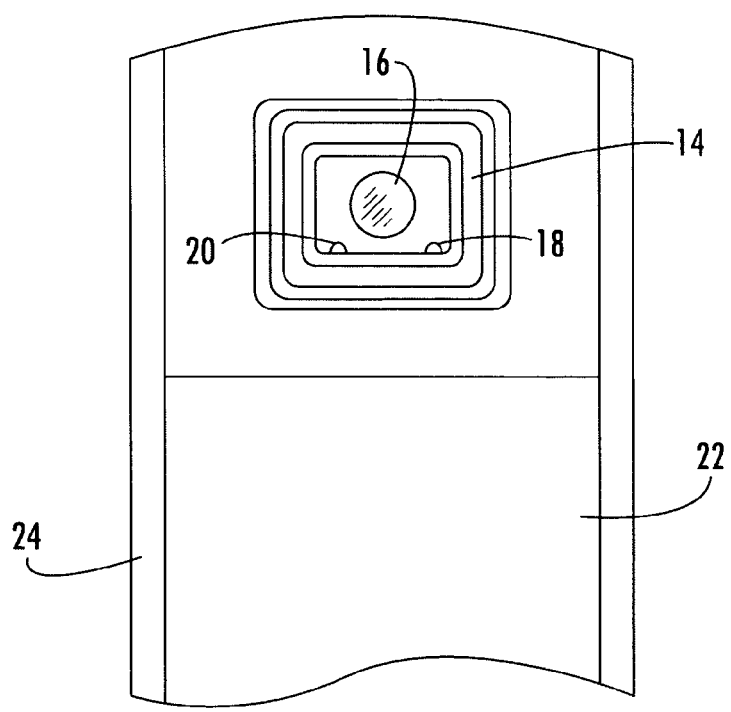
FIG. 3 is an enlarged front elevation showing the lens of the thermal imager of FIG. 1.

Referring now also to FIG. 3, housing 12 includes a front portion defining a hood 14 where the device's lens 16 is located. One skilled in the art will recognize that the target energy enters the device through lens 16. As will be described more fully below, a pair of light sensors 18 and 20 are positioned at respective left and right positions below lens 16. Preferably, light sensors 18 and 20 are robust optical sensors, such as silicon photo transistors mounted to a printed circuit board which is installed in the hood.

Referring now also to FIG. 2, a lens cover 22 is provided to cover lens 16 when imager 10 is not in use. Preferably, lens cover 22 is opaque so as to protect the imager's internal components from the passage of infrared radiation when the unit is not being used.

In this case, lens cover 22 slides up and down in a channel provided in front shroud 24. Shroud 24 extends to a location under handle 26 to facilitate placement of the entire unit in a computer docking station for recharging and specialized programming. A trigger 28 is located on handle 26, as shown. Trigger 28 permits the user to store selected images in the device's internal memory. In the illustrated embodiment, laser diode 30 projects a dot of light forward of the imager to facilitate aiming.

As will be described more fully below, cover 22 may be adapted to serve as the means by which the user turns the unit on and off. In this regard, cover 22 can be moved to the down position (shown) when imager 10 is in use. Cover 22 is moved to an up position in front of hood 14 when imager 10 is turned off. An appropriate mechanism turns the unit either on or off depending on the position of cover 22.

As noted above, exposure to high radiation sources, such as sunlight, can often damage the focal plane array located inside of imager 10. Because the user will slide lens cover 22 into a position over hood 14 when the unit is turned off, the unit will always be protected from sunlight exposure when in a powered off state.

Referring now particularly to FIG. 1, a display 32 is preferably located at the rear of imager 10. In FIG. 1, a variety of information is being shown on the display, including a thermal image of the device being inspected. A temperature gradient scale and other information may also be provided in different regions of the display. For example, this depiction indicates that the machine being inspected is a "compressor" based on stored information. Various buttons 34, 36 and 38 may also be provided on the rear portion of housing 12 to allow the user to perform various tasks.

Figure 4:
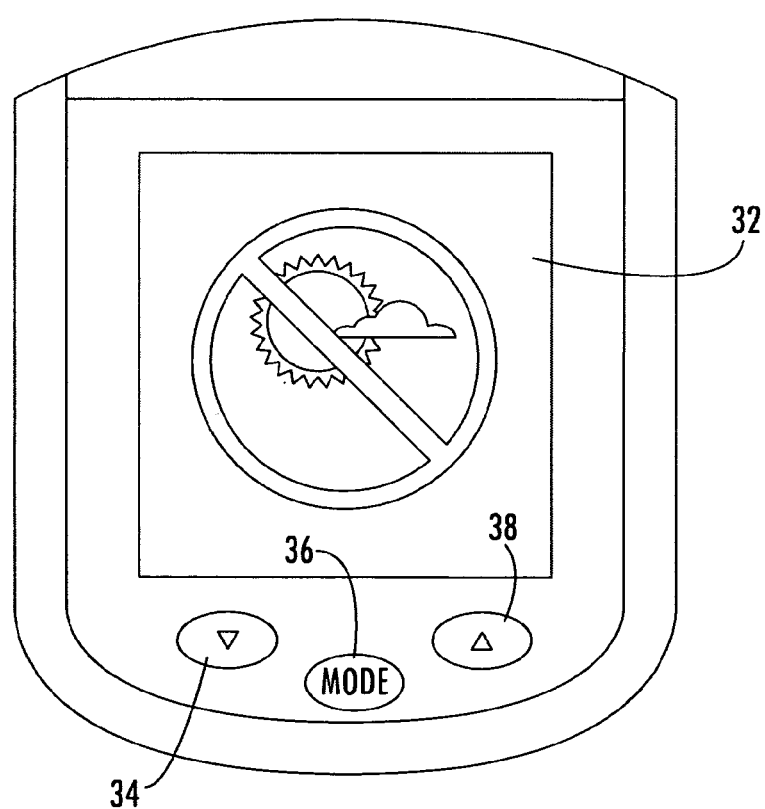
FIG. 4 is an enlarged rear elevation showing the display of the thermal imager of FIG. 1 in the sun protection mode.
Figure 5:
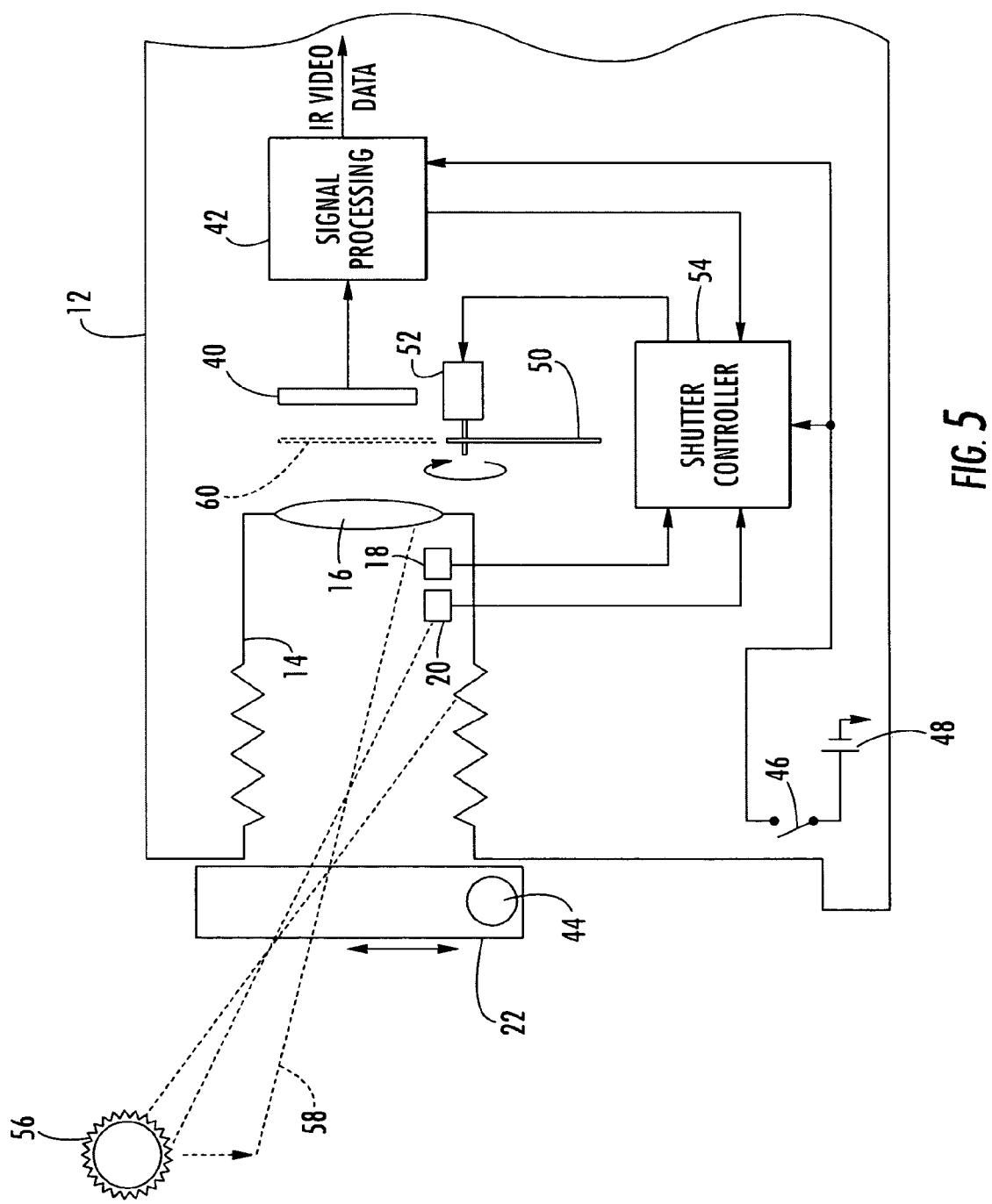
FIG. 5 is a schematic diagram of a sun protection mechanism constructed in accordance with the present invention.

Referring now to FIGS. 4 and 5, imager 10 includes a further mechanism for protecting the focal plane array when the unit is in use. When potentially damaging exposure is detected, the unit can advantageously enter a "sun protection mode." (As one skilled in the art will appreciate, the term "sun protection mode" indicates that potentially harmful levels of radiation have been detected from whatever source, including but not limited to the sun.) As shown in FIG. 4, display 32 will preferably depict a graphical representation so informing the user. In one preferred embodiment, the unit will remain in the protection mode until powered off and then on again. The user may accomplish this by sliding the lens cover 22 to a position over hood 14 and then back down.

Certain additional details will now be described with particular reference to FIG. 5. When lens cover 22 is moved to the power on position, incident radiation is allowed to enter hood 14. The radiation passes through lens 16 and impinges focal plane array (FPA) 40. In presently preferred embodiments, FPA 40 is an infrared (IR) FPA of any suitable type, such as alpha-silicon or vanadium oxide. FPA 40 converts the incident radiation into electrical signals which are then provided to signal processing circuitry 42. Circuitry 42 processes the raw signals to produce IR video and data that can be shown on display 32.

One technique for using lens cover 22 as a means to turn the unit off and on is also illustrated in FIG. 5. In this case, a small magnet 44 is in lens cover 22. (In presently preferred embodiments, magnet 44 is actually located near the top of lens cover 22.) When lens cover 22 is moved to the down position, reed switch 46 will close, providing power from battery 48 to the various components within imager 10. While a magnet/reed switch mechanism is shown in this embodiment, one skilled in the art will appreciate that other suitable mechanisms for turning the unit on and off can also be utilized.

Imager 10 includes a shutter which can protect FPA 40 from extensive sun exposure during operation. In this case, the shutter is configured as a "flag" 50 which is also used for offset correction during normal operation. Specifically, flag 50 will periodically rotate during normal operation to a position in front of FPA 40 to provide a temperature reference. Flag 50 is rotated by a small motor 52 which is operated by shutter controller circuitry 54.

The sun protection mechanism operates as follows in the illustrated embodiment. As imager 10 is raised in a direction toward the sun 56, excessive radiation will begin to enter hood 14. In most cases, however, this sunlight will encounter light sensors 18 and 20 before lens 16. This is illustrated in the diagram where radiation from the sun is shown impinging light sensor 20, but not lens 16. The sun's radiation will not directly impinge lens 16 unless and until imager 10 is moved to the position 58 relative to the sun.

Output signals from light sensors 18 and 20 are fed to circuitry 54. When the level of radiation detected by light sensors 18 and 20 exceeds a predetermined threshold, flag 50 will be rotated to a position in front of FPA 40 (as indicated at 60). As a result, flag 50 will prevent the incident radiation from impinging and possibly damaging FPA 40. In the illustrated embodiment, the graphical representation depicted in FIG. 4 will then be shown on display 32, informing the user that the device is in the sun protection mode.

It can thus be seen that the present invention provides a thermal imager having an effective sun protection mechanism. While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A hand-held thermal imaging apparatus comprising:
   a housing defining an entrance pupil for ingress of imaging radiation;
   at least one light sensor positioned forward of said entrance pupil;
   an electronic imaging device located in said housing rearward of said entrance pupil for converting said imaging radiation to electrical signals for further processing;
   a display located on said housing for showing thermal images detected by said electronic imaging device;
   a mechanical shutter having an open position and a closed position, wherein said shutter is located between said entrance pupil and said electronic imaging device in said closed position so as to inhibit exposure of said electronic imaging device to incident radiation; and
   circuitry for selectively operating said shutter to be in said closed position based on signals produced at said light sensor when incident radiation that would otherwise impinge said electronic imaging device exceeds a predetermined threshold.

2. A thermal imaging apparatus as set forth in claim 1, wherein said electronic imaging device is a focal plane array.

3. A thermal imaging apparatus as set forth in claim 2, wherein said focal plane array is an infrared focal plane array.

4. A thermal imaging apparatus as set forth in claim 1, wherein said light sensor is located in a portion of said housing forward of said entrance pupil forming a hood.

5. A thermal imaging apparatus as set forth in claim 4, wherein said light sensor is situated at a position in said hood below and forward of said entrance pupil.

6. A thermal imaging apparatus as set forth in claim 4, wherein said light sensor is situated at a position in said hood to detect sun exposure before imaging thereof by said electronic imaging device.

7. A thermal imaging apparatus as set forth in claim 4, wherein said light sensor comprises a silicon phototransistor.

8. A thermal imaging apparatus as set forth in claim 4, wherein said light sensor comprises a pair of light sensors.

9. A thermal imaging apparatus as set forth in claim 8, wherein said pair of light sensors are located at respective left and right positions below and forward of said entrance pupil.

10. A thermal imaging apparatus as set forth in claim 1, further comprising a lens cap adapted to cover said entrance pupil when said apparatus is not in use.

11. A thermal imaging apparatus as set forth in claim 10, wherein said apparatus is adapted to be in a powered off state when said lens cap in position to cover said entrance pupil.

12. A thermal imaging apparatus as set forth in claim 11, wherein a power switch is closed when said lens cap is not in position covering said entrance pupil.

13. A thermal imaging apparatus as set forth in claim 12, wherein said power switch is opened by a magnet carried by said lens cap.

14. A thermal imaging apparatus as set forth in claim 10, wherein said lens cap is slidable with respect to said housing.

15. An imaging apparatus comprising:
structure defining an entrance pupil for ingress of imaging radiation, said entrance pupil having a lens;
a focal plane array located rearward of said lens;
a mechanical shutter having an open position and a closed position, wherein said shutter is located between said lens and said focal plane array in said closed position so as to inhibit exposure of said focal plane array to incident radiation;
circuitry for selectively operating said shutter to be in a sun protection mode wherein said shutter is in said closed position when radiation that would otherwise impinge said focal plane array exceeds a predetermined threshold;
at least one light sensor located forward of said lens, said circuitry operative to control said shutter based on signals produced at said light sensor; and
a lens cap adapted to cover said entrance pupil when said apparatus is not in use, wherein said apparatus is adapted to be in a powered off state when said lens cap is in position to cover said entrance pupil.

16. An imaging apparatus as set forth in claim 15, further including a display on which a graphical representation is shown indicating that said imaging apparatus is in said sun protection mode.

17. An imaging apparatus as set forth in claim 15, wherein said shutter will remain in said sun protection mode until said apparatus is placed in said powered off state and subsequently placed in a powered on state.

* * * * *